United States Patent
Haselhoff et al.

(10) Patent No.: US 9,911,056 B2
(45) Date of Patent: Mar. 6, 2018

(54) METHOD OF GENERATING A TRAINING IMAGE FOR AN AUTOMATED VEHICLE OBJECT RECOGNITION SYSTEM

(71) Applicant: Delphi Technologies, Inc., Troy, MI (US)

(72) Inventors: Anslem Haselhoff, Wuppertal (DE); Dennis Mueller, Moers (DE); Mirko Meuter, Erkrath (DE); Christian Nunn, Huckeswagen (DE)

(73) Assignee: DELPHI TECHNOLOGIES, INC., Troy, MI (US)

( * ) Notice: Subject to any disclaimer, the term of this patent is extended or adjusted under 35 U.S.C. 154(b) by 98 days.

(21) Appl. No.: 14/952,025

(22) Filed: Nov. 25, 2015

(65) Prior Publication Data
US 2016/0162750 A1 Jun. 9, 2016

(30) Foreign Application Priority Data
Dec. 5, 2014 (EP) .................................... 14196504

(51) Int. Cl.
| | | |
|---|---|---|
| G06K 9/00 | (2006.01) | |
| G06K 9/46 | (2006.01) | |
| G06K 9/62 | (2006.01) | |
| G06K 9/66 | (2006.01) | |
| H04N 7/18 | (2006.01) | |
| G06T 7/246 | (2017.01) | |

(52) U.S. Cl.
CPC .......... *G06K 9/46* (2013.01); *G06K 9/00818* (2013.01); *G06K 9/00832* (2013.01); *G06K 9/6215* (2013.01); *G06K 9/66* (2013.01); *G06T 7/246* (2017.01); *H04N 7/18* (2013.01); *G06T 2207/10016* (2013.01); *G06T 2207/30248* (2013.01)

(58) Field of Classification Search
CPC .................................. G06K 9/46; G06F 3/013
See application file for complete search history.

(56) References Cited

U.S. PATENT DOCUMENTS

| | | | | |
|---|---|---|---|---|
| 8,879,805 B2* | 11/2014 | Wang | ................. | G06K 9/00288 382/118 |
| 2012/0121204 A1* | 5/2012 | Ding | .................... | G06T 3/0012 382/260 |
| 2012/0128210 A1* | 5/2012 | Zobel | ....................... | G06K 9/42 382/103 |

OTHER PUBLICATIONS

Pishchulin, I., et al.: "Articulated people detection and pose estimation: Reshaping the future", 2012 IEEE Conference on, IEEE, Jun. 16, 2012. pp. 3178-3185.
Barnes, C., et al.: "PatchMatch: A randomized correspondence algorithm for structural image editing", ACM Transactions on Graphics (TOG), ACM, US, Bd. 28, No. 3, Jul. 27, 2009, pp. 1-10.

(Continued)

*Primary Examiner* — Oneal R Mistry
(74) *Attorney, Agent, or Firm* — Lawrence D. Hazelton

(57) ABSTRACT

In a method of generating a training image for teaching of a camera-based object recognition system suitable for use on an automated vehicle which shows an object to be recognized in a natural object environment, the training image is generated as a synthetic image by a combination of a base image taken by a camera and of a template image in that a structural feature is obtained from the base image and is replaced with a structural feature obtained from the template image by means of a shift-map algorithm.

9 Claims, 3 Drawing Sheets

(56) References Cited

OTHER PUBLICATIONS

Yunqiang Liu, et al.: "Exemplar-Based Image Inpainting Using Multiscale Graph Cuts", IEEE Transactions on Image Processing IEEE Service Center, Piscataway, NJ, US, Bd. 22, No. 5, May 1, 2013, pp. 1699-1711.
Rematas Konstantinos, et al: "Image-Based Synthesis and Re-synthesis of Viewpoints guided by 3D Models" 2014 IEEE Conference on Computer Vision and Pattern Recognition, IEEE, Jun. 23, 2014, pp. 3898-3905.
Pritch, et al., "Shift-Map Image Editing", 2009 IEEE 12th International Conference on Computer Vision, pp. 151-158.

* cited by examiner

METHOD OF GENERATING A TRAINING IMAGE FOR AN AUTOMATED VEHICLE OBJECT RECOGNITION SYSTEM

CROSS-REFERENCE TO RELATED APPLICATION

This application claims the benefit under 35 U.S.C. § 119(a) of European Patent Application EP 14196504.6, filed Dec. 5, 2014, the entire disclosure of which is hereby incorporated herein by reference.

TECHNICAL FIELD OF INVENTION

The present invention relates to a method of generating a training image provided for the teaching of a camera-based object recognition system, and in particular which shows an object to be recognized in a natural object environment.

BACKGROUND OF INVENTION

Camera-based object recognition systems are becoming increasingly important in automotive engineering, in particular for operating automated vehicles. Computer-assisted image processing systems are able to reliably identify different objects of interest such as road signs, lane markings, pedestrians or the like in taken camera images. So-called teaching processes or training processes are frequently used to develop and/or to adapt the corresponding recognition algorithms. A series of training images are presented to the image processing system in this process. They are specimen images which show typical objects to be recognized in the corresponding object surroundings, i.e. in an expected or natural environment.

Different teaching processes are known in the technical field of image-based object recognition; however, they all require a considerable number of different training images to achieve an acceptable teaching result. In many practical cases, work is carried out with so-called classifiers by means of which the objects recognized in an image are classified into different discrete object classes. There is a known problem with systems that require a relatively large number of classes because the gathering or obtaining of the necessary training images is time-consuming and arduous. This problem can be made worse when the objects of specific classes occur relatively rarely in reality, i.e. in a natural environment. There are, for example, fourteen different versions of road signs used in Germany to indicate speed limits—from 5 km/h (kph) up to 130 km/h. It is understood that in it is extremely complex in this case to generate training image data sets of sufficient size for all fourteen classes, in particular for the classes having road signs which occur more rarely such as the speed limits of 5 km/h or 110 km/h.

SUMMARY OF THE INVENTION

There is therefore a need for a simplified method of generating training images. In accordance with one embodiment, a method of teaching a camera-based object recognition system suitable for use on an automated vehicle is provided. The method includes using a camera to provide a base image of an object in a natural object environment, wherein the base image includes an initial structural feature. The method also includes providing a template image that corresponds to the object, wherein the template image defines a substitute structural feature comparable to the initial structural feature. The method also includes generating a training image for teaching the system. The training image is generated by replacing the initial structural feature with the substitute structural feature by using a shift-map algorithm. The replacement of the initial structural feature is only carried out by rearrangement of pixels of the base image.

In accordance with the invention, the training image is generated as a synthetic image by a combination of a base image taken by a camera and a template image, that is so-to-say of a master illustration, where an initial structural feature of the object is identified in the base image, and is replaced with a substitute structural feature obtained from the template image by means of a shift-map algorithm.

In this manner, one and the same base image can be provided for different objects. For example, a sign for a speed limit of 50 km/h can be replaced with a sign for a speed limit of 5 km/h in a base image that was taken in a customary manner using a camera, which is also called a natural base image in this context. The effort for the provision of data can be considerably reduced by the use of such synthetic training images. The use of the shift-map algorithm provides that the generated synthetic image has an equally natural appearance as the natural base image. Whereas recognizable discrepancies with respect to the lighting conditions inevitably occur on a direct replacement of an image region corresponding to the respective object, the lighting level and the general appearance of the natural base image is consistently maintained on the replacement of an initial structural feature using the shift-map algorithm.

Further developments of the invention can be seen from the dependent claims, from the description, and from the drawings.

The replacement of the initial structural feature is preferably carried out only by rearranging pixels of the base image. A rearrangement process can be carried out for this purpose within the framework of the shift-map algorithm. This is advantageous in that only those tonal values that occur in the synthetic training image also occur in the natural base image. The training image thus has a completely naturally looking appearance even though it is a synthetic image.

An embodiment of the invention provides that the rearrangement of pixels of the base image is restricted to a portion, preferably to a central-portion, of the base image. This can take place in a simple manner by a suitable fixing of the optimization criteria of the shift-map algorithm. The rearrangement of the pixels can thus be restricted to that portion of an image in which typically to be recognized objects are expected. It is an advantage of this measure that the background or environment surrounding the object is not changed at all.

In accordance with a further embodiment of the invention, optimization criteria are made use of for the shift-map algorithm that include a maintenance of proximity relationships of pixels of the base image, an avoidance of tonal value discontinuities in the generated training image and/or the maintenance of a similarity between the base image and the template image. A particularly naturally appearing training image can be generated in this manner.

In accordance with a specific embodiment of the invention, the base image and the template image are compared with one another to determine a distance dimension indicating the similarity of the images. This distance dimension is used as the optimization criterion for the shift-map algorithm. The distance dimension delivers an objective criterion for the similarity of the respective images which can enter into an optimization function of the shift-map algorithm such as an energy function or a potential.

Both the base image and the template image are preferably transformed into a canonical-reference frame before they are compared with one another for determining the distance measurement. There is a sufficient object-related comparability of the two images in a canonical-reference frame. Tilts, distortions, or displacements of the objects can in particular be taken into account by a canonical transformation.

The substitute structural feature can be a texture and/or a pattern. If the objects to be recognized are road signs, the pattern can, for example, be the sequence of numbers which indicates the value for a speed limit.

The template image can be an image taken by a camera that is, in other words, a natural image. It is sufficient only to take a few images or even only one single image of a comparatively rare object in order to generate a plurality of different training images for this object type therefrom. Two natural images are therefore combined with one another in the generation of the training image in this embodiment.

An alternative embodiment of the invention provides that the template image is a graphically generated, i.e. a synthetic image. In principle, a set of training images can be generated for an object class of which not a single taken camera image, i.e. natural image, is present. The flexibility of the process is thereby particularly high.

The base image and the training image can each show a traffic sign in a road environment. It has been found that the method in accordance with the invention of generating training images is particularly well-suited for the teaching of an algorithm for recognizing road signs.

The invention therefor also relates to a method of teaching an object recognition system, in particular a road sign recognition system, in which training images are provided which show objects to be recognized in a natural object environment and in which a recognition algorithm for recognizing the objects is developed or adapted by means of an image processing system using the training images. In accordance with the invention, at least one training image is generated by a method as described above. It is preferred in practice for a plurality of training images to be generated by a method such as that described above. The effort of the data acquisition process can be considerably reduced by the provision of synthetic training images so that the teaching of the object recognition system is overall more efficient.

In accordance with an embodiment of this method, the recognition algorithm comprises a classification algorithm for associating a recognized object with one of a plurality of predefined object classes. Such a classifier can be taught particularly easily by providing synthetic training images.

The invention also relates to a computer program product which contains program instructions which execute a method of generating a training image and/or a method of teaching an object recognition system such as given above when the computer program is run on a computer.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
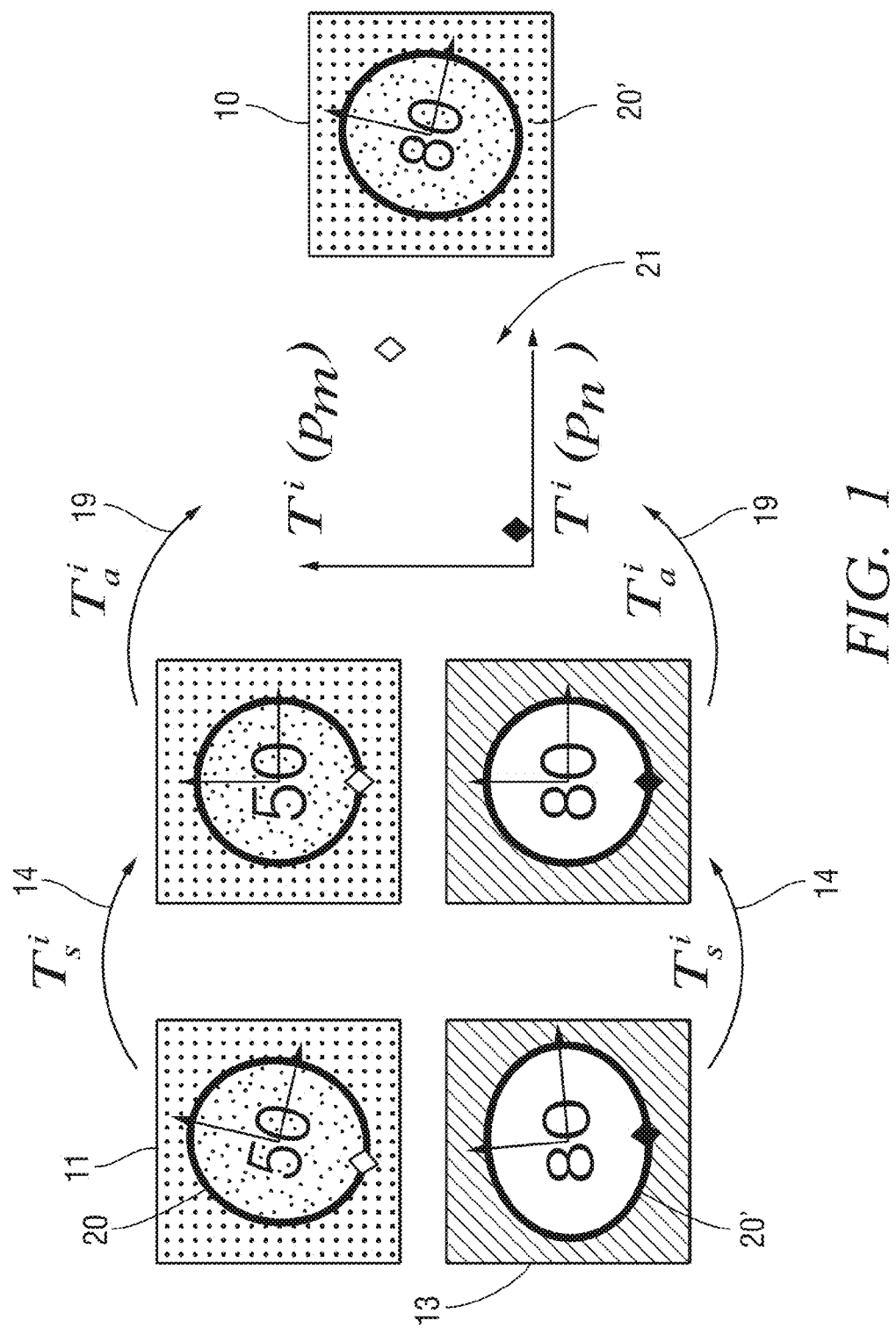
FIG. 1 shows in a schematic form different steps of a method in accordance with the invention of generating a training image.

The method of generating a training image 10 shown schematically in FIG. 1 requires a base image 11 and a template image 13 as an input data set. In the embodiment shown, the base image 11 and the template image 13 each show a road sign 20, 20' in a road carriageway environment or natural object environment. The road sign 20 of the base image 11 represents a speed limit of 50 km/h, whereas the road sign 20' of the template image 13 represents a speed limit of 80 km/h.

Whereas the base image 11 is a natural image taken by a camera, the template image 13 can be either a natural image taken by a camera or a graphically generated image. The base image 11 serves as a reference model for the training image 10 to be generated and defines a pool of gray values or color values which are used for generating the training image 10. In other words, the base image 11 defines the appearance of the training image 10 with respect to possible gray values and with respect to the shape of the road sign 20. The content of the road sign 20', for example the numbers for indicating the speed limit as shown in FIG. 1, is taken from the template image 13 as a substitute structural feature and is provided as a replacement for the corresponding initial structural feature of the base image 11. The pattern of the road sign 20 is therefore replaced in the base image 11 with that of the road sign 20' of the template image 13.

Since the base image 11 and the template image 13 typically arise from different lighting conditions, a simple replacement of the image regions corresponding to the road signs 20, 20' would likely produce an unnaturally looking training image 10. A rearrangement is carried out for this reason using a shift-map algorithm to swap the structural features. Shift-map algorithms are generally known in the field of digital image processing and are described for example in the paper by Pritch et al., "*Shift-Map Image Editing*", 2009 IEEE 12th International Conference on Computer Vision, pages 150-158.

Different optimization criteria, for example in the form of a potential function or of an energy function, are laid down for the shift-map algorithm. One of the optimization criteria is the maintenance of a similarity between the base image 11 and the template image 13. For this purpose, the base image 11 and the template image 13 are transformed by means of a first transformation 14 and by means of a subsequent second transformation 19 into a canonical-reference frame 21. The first transformation 14 is a so-called shape transformation for compensating distortions, tilts and displacements of the road signs 20, 20'. The second transformation 19 is a so-called appearance transformation that is an image adaptation or feature extraction, which make the base image 11 and the template image 13 comparable with one another. An invariance of the appearance of the road signs 20, 20' is thus achieved by the second transformation 19. The second transformation 19 can specifically comprise a feature extractor which is based on a histogram equalization, a variance normalization, an edge image, a "histogram of oriented gradients" and/or an orthogonal transformation.

Distortions, tilts and displacements of the road signs 20, 20' are therefore compensated in the canonical-reference frame 21 so that the base image 11 and the template image 13 can be objectively compared with one another. A distance dimension is then determined which indicates the similarity of the images 11, 13 and which is used directly as the optimization criterion for the shift-map algorithm. Further optimization criteria are a maintenance of proximity relationships of pixels of the base image 11 and an avoidance of tonal value discontinuities in the generated training image 10.

The potential function of the shift-map algorithm is preferably composed of four different terms, namely a unary pool potential, a unary object potential, a unary similarity potential and a pair-wise potential. The unary pool potential defines the pool of possible positions of the base image which can be used for the design of the training image 10. The unary object potential defines the region in which the road signs 20, 20' are localized in the base image 11 and in the template image 13—here corresponding to the central image region. The unary similarity potential defines a similarity measure between the base image 11 and the template image 13 as mentioned above. The pair-wise potential provides that discontinuities in the training image 10 are avoided. This means the pair-wise potential provides a sufficiently smooth character of the shift map.

After execution of the shift-map algorithm, a synthetic training image 10 is present which has the general appearance of the base image 11, but shows the road sign 20' of the template image 13.

Figure 2A:
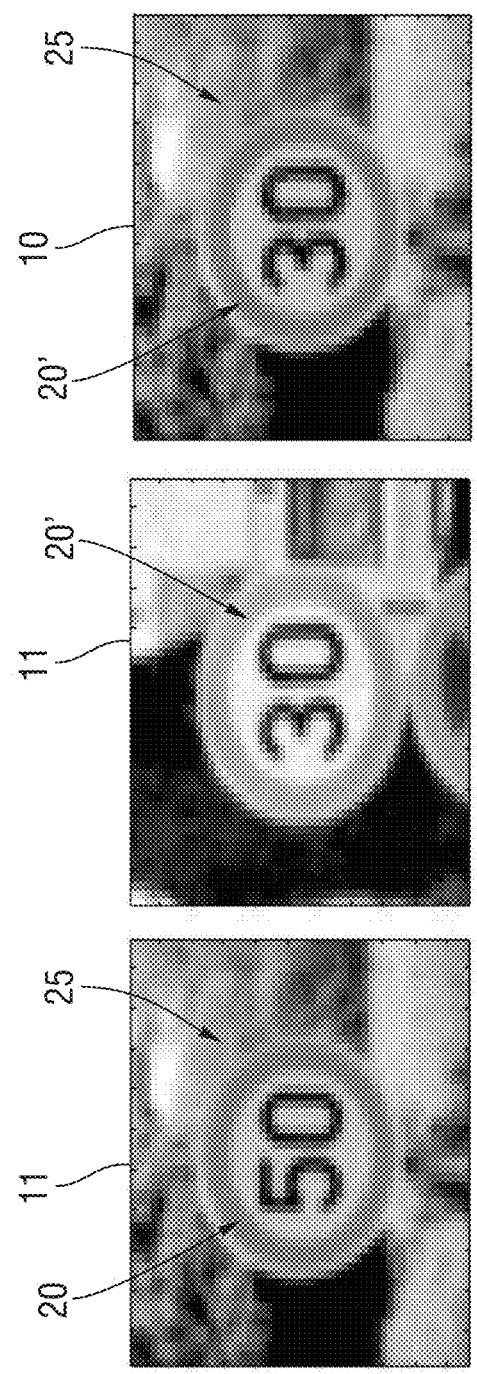
FIG. 2A shows a base image, a template image and a training image generated from the base image and the template image by means of a method in accordance with the invention.
Figure 2B:
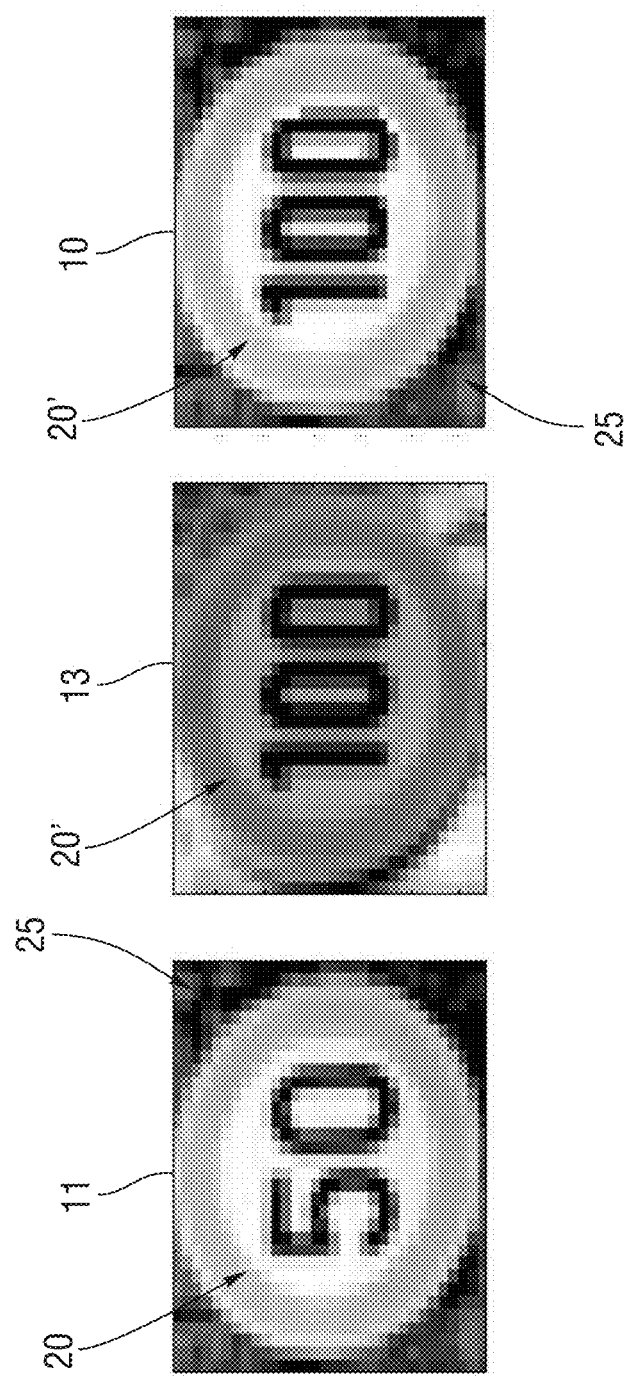
FIG. 2B shows a further example for a base image, a template image, and a training image generated from the base image and the template image by means of a method in accordance with the invention.

FIGS. 2A and 2B show respective examples for a base image 11, a template image 13 and a training image 10 synthesized using the above-explained algorithm. It can respectively be recognized that the training image 10 generally has the appearance of the base image 11. The background, i.e. a road environment or a natural object environment 25, that is the environment of the road sign 20', has specifically remained completely unchanged. The value for the speed limit was, however, changed in accordance with the road sign 20' shown in the template image 13—in FIG. 2A from 50 to 30 and in FIG. 2B from 50 to 100. Since no image regions were copied, but rather only pixels of the base image 11 were rearranged, the brightness of the road sign 20' in the training image 10 corresponds to that of the base image 11 and not, for instance, that of the template image 13. The training image 10 thus has a natural appearance even though it is a synthesized image.

A plurality of training images can, for example, be generated using the described method; they each show a road sign 20' having the speed limit 30 km/h and in this respect have a different background provided that there is a sufficient number of base images 11 which show the road signs 20 with other speed limits. A set of training images 10 can thus be provided in a time-saving and simple manner which serves as an input for a method of teaching a road sign recognition system. A recognition algorithm for recognizing the road signs 20 can then be developed or adapted using the training images 10. Such a recognition algorithm preferably comprises a classifier for associating recognized road signs 20 with one of a plurality of predefined classes, for example with one of 14 classes of German speed limit signs.

Both the described method of generating a training image 10 and the associated method of teaching the road sign recognition system can be run on any desired computer with a sufficient performance ratio. It is understood that a method in accordance with the invention of generating training images 10 is not only advantageous in the teaching of road sign recognition systems, but also in conjunction with any desired trainable camera-based object recognition algorithms.

While this invention has been described in terms of the preferred embodiments thereof, it is not intended to be so limited, but rather only to the extent set forth in the claims that follow.

We claim:

1. A method of teaching a camera-based object recognition system suitable for use on an automated vehicle, said method comprising:
using a camera to provide a base image of an object in a natural object environment, wherein the base image includes an initial structural feature;
providing a template image that corresponds to the object, wherein the template image defines a substitute structural feature comparable to the initial structural feature; and
generating a training image for teaching the system, wherein the training image is generated by replacing the initial structural feature with the substitute structural feature by using a shift-map algorithm, wherein the replacement of the initial structural feature is only carried out by rearrangement of pixels of the base image, wherein the base image and the template image are compared with one another to determine a distance dimension indicating the similarity of the images, the distance dimension is used as an optimization criterion for the shift-map algorithm, and both the base image and the template image are transformed into a canonical-reference frame before the base image and the template image are compared using the distance dimension.

2. The method in accordance with claim 1, wherein the rearrangement of pixels of the base image is restricted to a portion of the base image.

3. The method in accordance with claim 1, wherein the rearrangement of pixels of the base image is restricted to a central-portion of the base image.

4. The method in accordance with claim 1, wherein optimization criteria are made use of for the shift-map algorithm which comprise one of a maintenance of proximity relationships of pixels of the base image, an avoidance of tonal value discontinuities in the generated training image, and a maintenance of a similarity between the base image and the template image.

5. The method in accordance with claim 1, wherein the substitute structural feature comprises a texture and/or a pattern.

6. The method in accordance with claim 1, wherein the template image is an image taken by a camera.

7. The method in accordance with claim 1, wherein the template image is a graphically generated image.

8. The method in accordance with claim 1, wherein the base image and the training image each show a road sign in a road environment.

9. A method of generating a training image for teaching of a camera-based object recognition system that is suitable for use on an automated vehicle and which shows an object to be recognized in a natural object environment, wherein the training image is generated as a synthetic image by combination of a base image taken by a camera and of a template image in that an initial structural feature is removed from the base image and is replaced with a substitute structural feature obtained from the template image by means of a shift-map algorithm, wherein the replacement of the initial structural feature is only carried out by rearrangement of pixels of the base image, wherein the base image and the template image are compared with one another to determine a distance dimension indicating the similarity of the images, the distance dimension is used as an optimization criterion for the shift-map algorithm, and both the base image and the template image are transformed into a canonical-reference frame before the base image and the template image are compared using the distance dimension.

* * * * *